No. 795,589. PATENTED JULY 25, 1905.
J. J. DOWELL.
STOCK FEEDER.
APPLICATION FILED JULY 18, 1904.

2 SHEETS—SHEET 1.

WITNESSES:

INVENTOR
Joel J. Dowell
BY
ATTORNEYS

No. 795,589. PATENTED JULY 25, 1905.
J. J. DOWELL.
STOCK FEEDER.
APPLICATION FILED JULY 18, 1904.
2 SHEETS—SHEET 2.
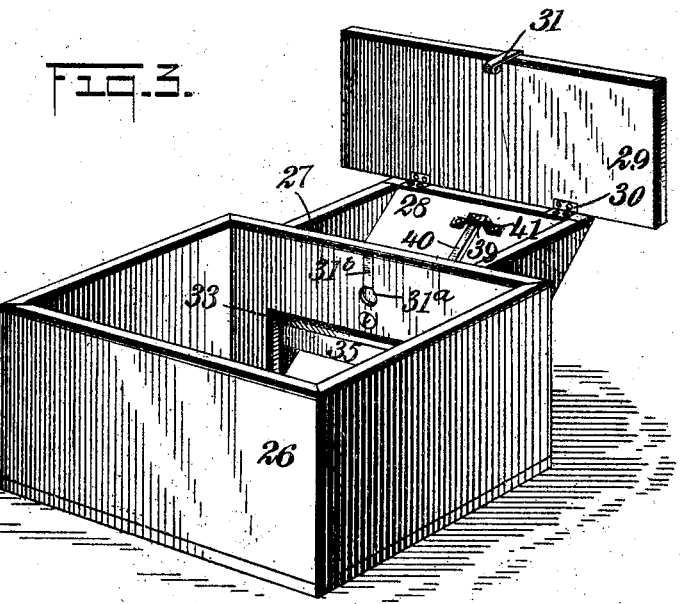
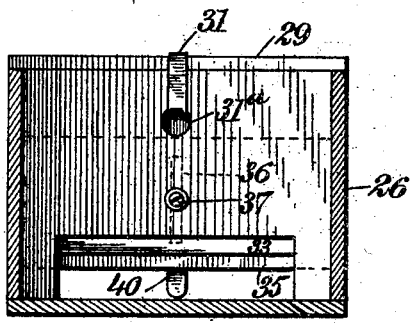
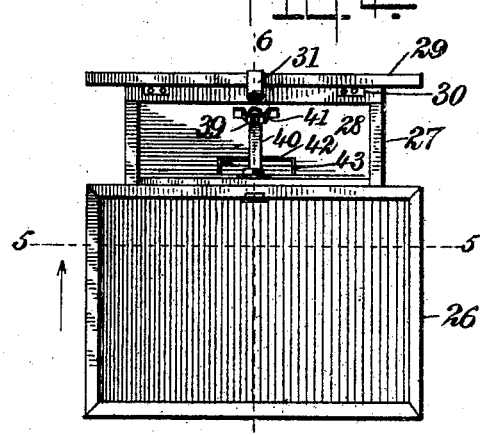
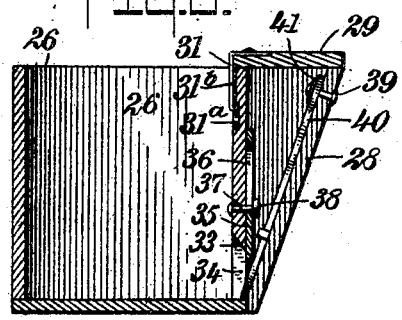
WITNESSES:
INVENTOR
Joel J. Dowell
BY
ATTORNEYS.

UNITED STATES PATENT OFFICE.

JOEL JARVIS DOWELL, OF SAN FRANCISCO, CALIFORNIA.

STOCK-FEEDER.

No. 795,589.     Specification of Letters Patent.     Patented July 25, 1905.

Application filed July 18, 1904. Serial No. 217,028.

*To all whom it may concern:*

Be it known that I, JOEL JARVIS DOWELL, a citizen of the United States, and a resident of San Francisco, in the county of San Francisco and State of California, have invented a new and Improved Stock-Feeder, of which the following is a full, clear, and exact description.

My invention relates to stock-feeders, my more particular object being to produce a feeder in which the supply of feed is to some extent under the control of the animals to be fed.

Reference is to be had to the accompanying drawings, forming a part of this specification, in which similar characters of reference indicate corresponding parts in all the figures.

Figure 1:
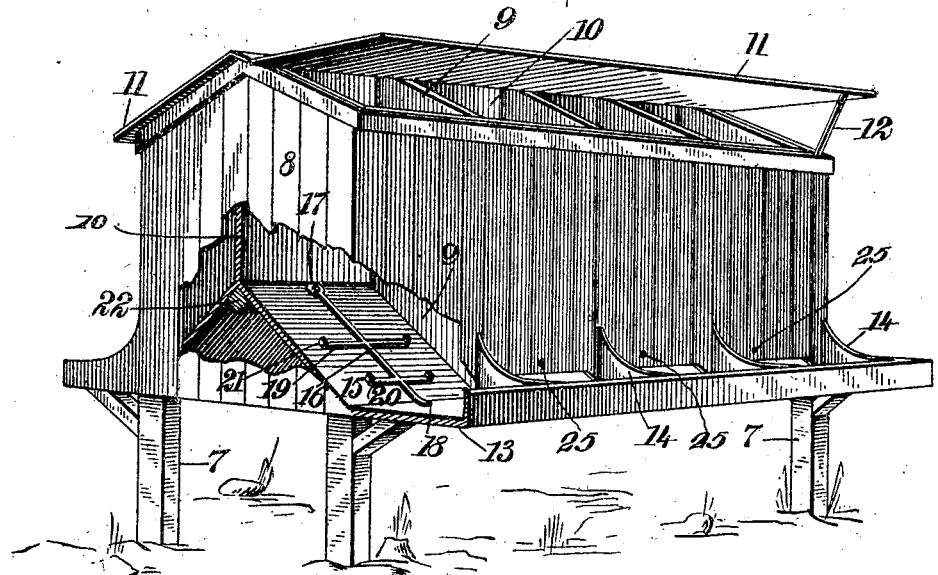
Figure 2:
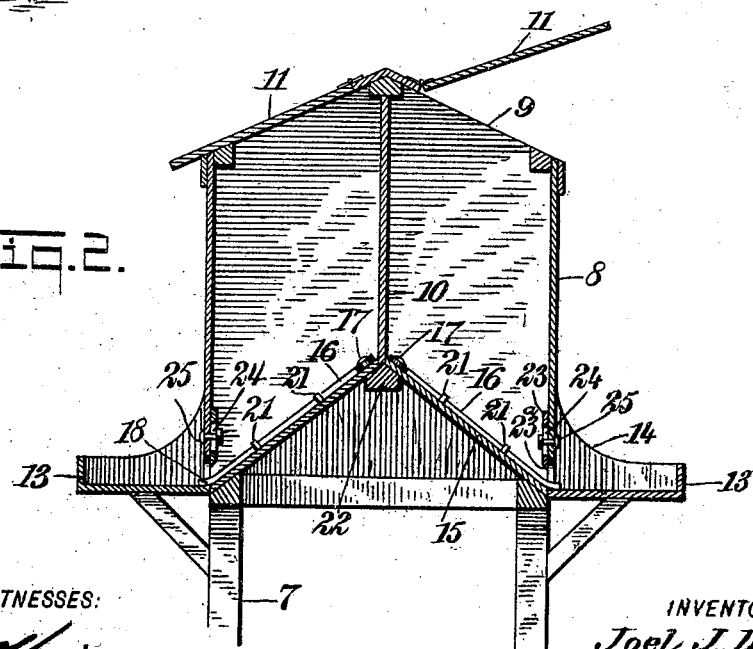

Figure 1 is a perspective view of one form of my feeder, certain parts being broken away. Fig. 2 is a vertical section through the same. Fig. 3 is a perspective view of another form of my feeder. Fig. 4 is a plan view of the structure shown in Fig. 3. Fig. 5 is a vertical section upon the line 5 5 of Fig. 4 looking in the direction of the arrow, and Fig. 6 is a vertical section upon the line 6 6 of Fig. 4 looking in the direction of the arrow.

As shown in Figs. 1 and 2, upon a framework 7 is mounted a housing 8, provided with transverse partitions 9 and a central partition 10, whereby the space inclosed by the housing is divided into compartments or bins. The doors 11 are hinged upon the housing 8. Each of these doors may be propped in the position indicated in Fig. 1 by means of a brace 12. The trough is shown at 13 and is subdivided by means of partitions 14. Runways 15 are disposed within the housing and are inclined relatively to each other, as shown. Upon each runway is an agitator 16, provided with a pivot 17 and free to swing upon the same. Each agitator 16 has preferably the form of a cross, being provided with arms 19 20, each arm being provided with an upturned portion 21. All parts of the agitator are preferably integral. An angle-beam 22 is used to support the runways 15. Upon each side of the housing 8 a slide 23, provided with a slot 24, is mounted upon pins 25 and adjustable vertically. This slide is provided with a bevel $23^a$ and is used to govern the general rate of flow of the substance to be fed downward.

The food is thrown in at the top of the housing 8, the requisite quantity being apportioned off to each bin. The animals feed from the trough 13, each animal preferably occupying a position intermediate of two successive partitions 14. The movements of the animal's nose and jaws while eating cause the curved end 18 of the agitator 16 to move laterally, thereby causing the arms 19 20 to disturb the position of the food, thus facilitating the supply thereof downward. As the food passes beneath the bevel edge $23^a$ the supply is governed partly by the position of the slide 23 and partly by the movements of the agitator 16.

In the form shown in Fig. 3 the casing 26 is provided with a hopper 27, provided with an inclined bottom 28 and a door 29, hinged to the hopper at 30 and provided with a clasp 31. This clasp is free to engage a hole $31^a$ in the casing 26, thereby holding the door 29 closed, as indicated in Fig. 6. A bevel 33 is provided by cutting a slot 34 in the casing 26, as shown in Fig. 6. A slide 35, beveled at its lower end, as shown, is provided with a slot 36, which is engaged by a pin 37, provided with a nut 38. A pivot-pin 39 passes through the bottom 28 of the hopper. Mounted upon this pin and free to swing relatively to the bottom of the hopper is an agitator 40, the upper end of which is engaged by the pin or pivot 39, which also engages a strap 41. The agitator 40 is provided with arms 42, having upturned ends 43.

The action of the device shown in Figs. 3, 4, 5, and 6 is somewhat analogous to the action of the device shown in Figs. 1 and 2, the chief difference being in the number of animals which may be fed from a single device. The animal eats from the casing 26, which serves as a sort of trough. The general regulation of the feed is accomplished by means of the slide 35, which may be adjusted by means of the nut 38, pin 37, and slot 36. The food is placed in the hopper 27 and gradually works its way beneath the slide 35. The animal by moving the agitator 40 to the right or to the left constantly disturbs the position of the food within the hopper and causes it to descend.

I find that animals—such, for instance, as horses—when fed by either of the devices above described soon learn to manipulate the agitator 16 or 40, so as to control the supply of food at will.

Having thus described my invention, I claim as new, and desire to secure by Letters Patent—

1. A stock-feeder, comprising a food-receptacle provided with an exit, and having an inclined bottom leading to said exit, and an agitator pivoted on the inclined bottom, said agitator being provided with a portion extending through said exit and free to move relatively to said receptacle when actuated by the animal to be fed.

2. In a stock-feeder, the combination of a receptacle for holding food, said receptacle being provided with an exit, and an agitator pivotally mounted therein and having substantially the form of a cross, said agitator being provided with a portion extending partially through said exit.

3. In a stock-feeder, the combination of a receptacle provided with a slot and having an inclined bottom leading to the slot, a slide disposed adjacent to said slot, means for adjusting said slide relatively to said slot, and an agitating device pivoted at its upper end on the upper part of the inclined bottom, and controllable by movements of the animal to be fed for governing the supply of food from said receptacle through said slot.

4. In a stock-feeder, the combination of a food-receptacle provided with a slot, a slide disposed adjacent to said receptacle and provided with a bevel edge, means for adjusting said slide relatively to said slot, and an agitator having substantially the form of a cross and pivotally mounted within said receptacle, said agitator being provided with a portion extending through said slot.

5. In a stock-feeder, the combination of an inclined runway for supplying food to the animals to be fed, and a member pivotally mounted thereon and movable relatively thereto, said member being provided with cross-arms for the purpose of changing the position of the food passing down said runway.

6. In a stock-feeder, the combination of an inclined runway, an agitator pivotally mounted thereon and having substantially the form of a cross provided with arms, said arms having upturned ends, said agitator being further provided with a curved portion to be engaged by the animals to be fed for the purpose of moving said agitator.

In testimony whereof I have signed my name to this specification in the presence of two subscribing witnesses.

JOEL JARVIS DOWELL.

Witnesses:
FRED F. GIOTTONINI,
THEO. J. STEINY.